(12) United States Patent
Liu et al.

(10) Patent No.: US 12,723,927 B2
(45) Date of Patent: Sep. 1, 2026

(54) TEMPERATURE MEASUREMENT METHOD AND APPARATUS BASED ON PASSIVE RFID TAG

(71) Applicants: NANJING UNIVERSITY, Nanjing (CN); JIANGSU TOOKER ROBOTICS CO., LTD., Suzhou (CN)

(72) Inventors: Jia Liu, Nanjing (CN); Lijun Chen, Nanjing (CN); Xingyu Chen, Nanjing (CN); Xu Zhang, Nanjing (CN); Fuxing Wang, Suzhou (CN)

(73) Assignees: NANJING UNIVERSITY, Nanjing (CN); JIANGSU TOOKER ROBOTICS CO., LTD., Suzhou (CN)

( * ) Notice: Subject to any disclaimer, the term of this patent is extended or adjusted under 35 U.S.C. 154(b) by 267 days.

(21) Appl. No.: 18/570,703

(22) PCT Filed: Jun. 18, 2021

(86) PCT No.: PCT/CN2021/100850
§ 371 (c)(1),
(2) Date: Dec. 15, 2023

(87) PCT Pub. No.: WO2022/261926
PCT Pub. Date: Dec. 22, 2022

(65) Prior Publication Data

US 2024/0295446 A1 Sep. 5, 2024

(51) Int. Cl.
*G01K 11/00* (2006.01)
*G06K 19/07* (2006.01)

(52) U.S. Cl.
CPC .......... *G01K 11/00* (2013.01); *G06K 19/0717* (2013.01); *G06K 19/0723* (2013.01)

(58) Field of Classification Search
None
See application file for complete search history.

(56) References Cited

U.S. PATENT DOCUMENTS

2001/0004236 A1* 6/2001 Letkomiller ........... B60C 23/20 340/595
2007/0222590 A1 9/2007 Posamentier
2009/0287092 A1* 11/2009 Leo ........................ A61B 90/06 385/12

FOREIGN PATENT DOCUMENTS

CN 101228538 A 7/2008
CN 102762967 A 10/2012
CN 102831457 A 12/2012
(Continued)

*Primary Examiner* — Erica S Lin
(74) *Attorney, Agent, or Firm* — SZDC Law PC

(57) ABSTRACT

A temperature measurement method based on a passive RFID tag. The method comprises: acquiring a circuit temperature feature of a tag multiple times, and establishing a tag temperature-feature correspondence; and estimating, by using the tag temperature-feature correspondence and the current circuit temperature feature of the tag, the temperature of an environment where the tag is located, wherein the circuit temperature feature of the tag is the persistence time within which a passive RFID tag can operate normally during a discharging process after the tag is fully charged. By means of the method, a robust and accurate temperature measurement is achieved, and a tag can be directly deployed on an existing commercial RFID device without modifying the hardware of the tag and a reader.

11 Claims, 13 Drawing Sheets

(56) References Cited

FOREIGN PATENT DOCUMENTS

| | | | |
|---|---|---|---|
| CN | 103903045 | A | 7/2014 |
| CN | 103955721 | A | 7/2014 |
| CN | 107727251 | A | 2/2018 |
| CN | 112132247 | A | 12/2020 |

* cited by examiner

TEMPERATURE MEASUREMENT METHOD AND APPARATUS BASED ON PASSIVE RFID TAG

This application is the National Stage Application of PCT/CN2021/100850, filed on Jun. 18, 2021.

TECHNICAL FIELD

The present disclosure relates to the field of radio frequency identification (RFID), in particular to a temperature measurement method and apparatus based on a passive RFID tag.

BACKGROUND

Temperature is a physical quantity that represents how cold and hot an object is. In the production and life, the physicochemical properties of the vast majority of common substances are temperature-dependent, so temperature measurement is very important. Currently, the temperature sensor has extremely wide application in the fields of fire prevention, cold chain transportation, agricultural production, etc., and has great practical value and development prospect. However, traditional temperature measurement technology can not be used in non-line-of-sight (with obstructions) scenarios, such as: Bridges and smart buildings internal structural health monitoring, it is necessary to explore new non-line-of-sight temperature measurement technology.

Radio frequency identification (RFID) technology is a contactless automatic identification technology that is fundamental and central to the realization of the Internet of Things. This technology is currently widely used in various areas of society, such as mobile payment, authentication, logistics, and warehousing. Existing RFID tags are divided into active tags and passive tags according to whether there is a battery or not. Relatively speaking, passive tags are favored by the market due to their advantages of low cost, long service life and simple maintaining.

The current prevailing temperature measurement method based on passive RFID technology performs temperature measurement by embedding a dedicated temperature sensor to the tag, and uses only the communication function of RFID to transmit the collected temperature data to the user. This approach significantly increases the manufacturing cost of passive RFID tags and is not conducive to widespread use. While passive RFID tags are generally less energy consuming, the use of an additional temperature sensor also reduces the communication distance and computing capability of the tag. Subject to the above shortcomings, this approach is difficult to use in practical scenarios.

In order to overcome this problem, some work has tried in recent years to use unmodified general passive tags for temperature measurement. The main idea of these methods is to use the physical layer information of the tag signal as the feature to detect temperature changes. In general, temperature will change the resistance of the tag circuit, thereby affecting the radio signal emitted by the tag. By analyzing the physical characteristics of the tag signal, changes in temperature can be observed and thus the temperature of the environment where the tag is located can be obtained. However, temperature detection methods based on physical layer information of the tag signal typically require the use of expensive radio wave analysis equipment, and some of the methods are very sensitive to environmental changes and the tag position cannot be changed during detection.

SUMMARY

In order to overcome the shortcomings of existing temperature measurement means based on passive RFID technology, the present disclosure provides a temperature measurement method and apparatus based on a passive RFID tag. By means of the method, a tag can be used for temperature measurement in the presence of obstacles, while complying with ISO standards without any additional equipment and hardware changes, and is minimally affected by the external environment.

Based on the above objective, the technical solution of the present disclosure is as follows:

A temperature measurement method based on a passive RFID tag, including: acquiring a circuit temperature feature of a tag multiple times, and establishing a tag temperature-feature correspondence; and estimating, by using the tag temperature-feature correspondence and the current circuit temperature feature of the tag, the temperature of an environment where the tag is located, wherein the circuit temperature feature of the tag is the maximum discharging duration within which a passive RFID tag can operate normally during a discharging process after the tag is fully charged and then powered off.

Acquiring the circuit temperature feature of the tag multiple times, and establishing the tag temperature-feature correspondence may specifically include: placing the tag in different temperature environments, measuring and recording the maximum discharging duration corresponding to the temperatures, and forming a feature set of two-element tuples that consist of the maximum discharging duration and the temperature values; fitting the feature set of the tag to obtain the temperature-feature correspondence.

Preferably, the maximum discharging duration is determined by measuring the de-energized persistence time of volatile memory of the tag.

Regarding the method for measuring the de-energized persistence time, the following implementations are provided:

(1) writing data into the volatile memory of a tag by the reader, wherein the volatile memory requires electrical power to maintain data states; turning off the reader, and querying the data of the volatile memory after the waiting time t: if the data changes, taking the current waiting time as the de-energized persistence time of the volatile memory; if the data does not change, updating the waiting time t with a step length $\Delta t$, and returning to the operation of writing data until the waiting time corresponding to the data change is acquired.

(2) writing data into the volatile memory of multiple target tag by the reader, wherein the volatile memory requires electrical power to maintain data states; turning off the reader, and querying the data of the volatile memory after the waiting time t if there are tags whose data changes for the first time, taking the current waiting time as the de-energized persistence time of the volatile memory of the corresponding tags; if there are no tags whose data changes, updating the waiting time t with a step length $\Delta t$, and returning to the operation of writing data; if there are tags whose data does not change, updating the waiting time t with a step length $\Delta t$, and returning to the operation of writing data until the de-energized persistence time of the volatile memory of all the target tags is acquired.

When the volatile memory is specifically the S1 inventoried flag, trying different waiting time is not needed, and the de-energized persistence time can be measured only within one time window, thus reducing a lot of overhead, and the following implementations are provided:

(1) writing data into the volatile memory of a tag by the reader, wherein the volatile memory requires electrical power to maintain data states; and querying, by the reader, the data of the volatile memory continuously until the data changes, and taking the waiting time for waiting for the data change as the de-energized persistence time of the volatile memory.

(2) writing data into the volatile memory of multiple target tag by the reader, wherein the volatile memory requires electrical power to maintain data states, by the reader, the data of the volatile memory continuously, if there are tags whose data changes, taking the current waiting time as the de-energized persistence time of the volatile memory of the corresponding tags until the de-energized persistence time of the volatile memory of all the target tags are acquired.

The multiple target tags may be an unmeasured tag subset of a target tag set within a reading range of the reader, and the reader selects a new unmeasured tag subset for measurement multiple times until the de-energized persistence time of all target tags within the reading range of the reader is measured.

In obtaining the temperature-feature correspondence, the temperature-feature function may be obtained by performing least-squares fitting on the feature set of the tag.

In order to improve the efficiency of calibration, a common temperature-feature function may be employed for tags of the same model, specifically, feature sets of multiple tags may be merged, and a common temperature-feature function of the multiple tags can be obtained by fitting; or, parameters in the temperature-feature function are obtained by performing least-squares fitting on the feature sets of the multiple tags respectively, and average values of the corresponding parameters are taken as the parameters of the common temperature-feature function of the multiple tags.

Accordingly, the present disclosure also provides a temperature measurement apparatus based on a passive RFID tag, including a reader and a master controller, wherein the master controller communicates with the reader such that the apparatus can perform the temperature measurement method as described above.

The present disclosure has the following beneficial effects:

Higher robustness against changes in environment, high measurement accuracy; non-line-of-sight temperature sensing; and does not require any modifications to the hardware or firmware of the tags and readers, so it can be deployed directly on existing commercial RFID devices.

The foregoing and other objects, advantages and features of the present disclosure will become more apparent to those skilled in the art from the following detailed description of specific embodiments of the present disclosure when taken in conjunction with the accompanying drawings.

BRIEF DESCRIPTION OF FIGURES

Hereinafter, some specific embodiments of the present disclosure will be described in detail by way of example and not limitation with reference to the accompanying drawings, in which the same reference numerals indicate the same or similar parts or parts, and it should be understood by those skilled in the art that these drawings are not necessarily drawn to scale. In the drawings.

DETAILED DESCRIPTION

In order to make the above objects, features and advantages of the present disclosure more obvious and easy to understand, the specific embodiments of the present disclosure will be described in detail with reference to the accompanying drawings. In the following description, numerous specific details are set forth in order to provide a thorough understanding of the present disclosure, but the present disclosure can be implemented otherwise than as described herein. Similar modifications may be made by those skilled in the art without departing from the spirit of the present disclosure, and therefore the present disclosure is not limited to the specific embodiments disclosed below.

An RFID system usually includes an RFID reader, an antenna and an RFID tag, wherein a passive tag does not have a built-in power source. The reader communicates with the tag within a certain range by releasing carrier waves via the antenna, and the passive RFID tag continuously captures energy from the carrier waves released by the reader. In order to ensure reliable and continuous operation, the tag needs to store some electrical energy in a chip of the tag, which is equivalent to a capacitor circuit.

Figure 1:
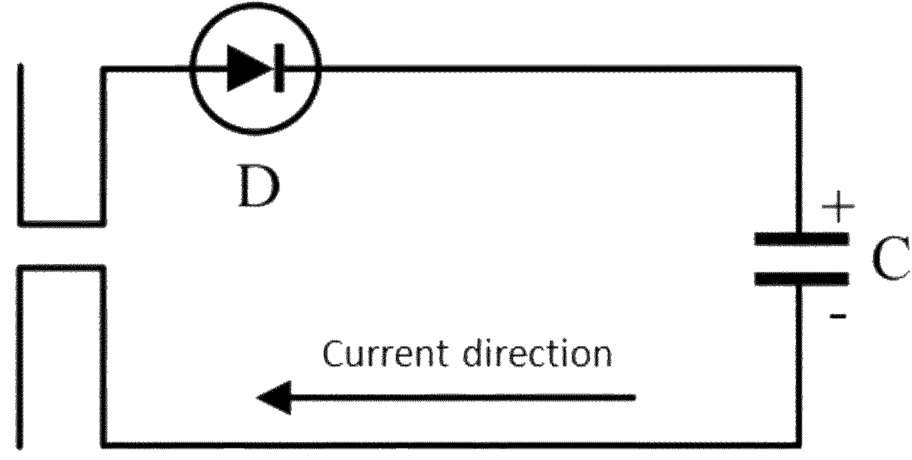
FIG. 1 is an equivalent circuit diagram of a passive RFID tag chip charging process.
Figure 2:
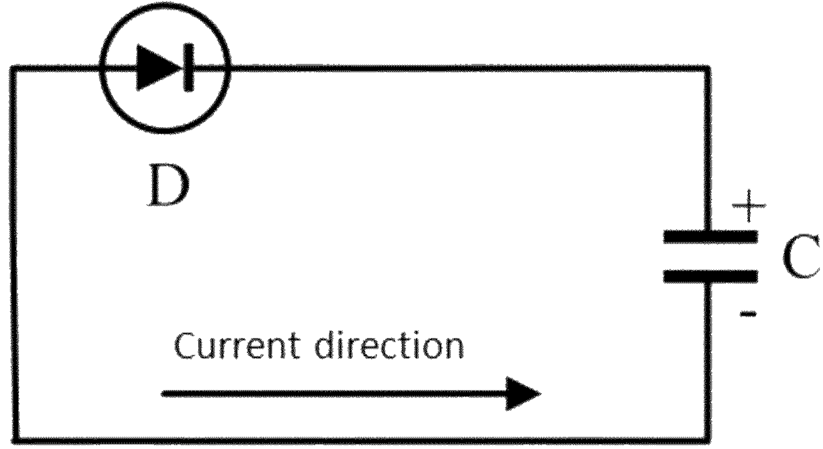
FIG. 2 is an equivalent circuit diagram of a passive RFID tag chip discharging process.

As shown in FIG. 1, which is an equivalent circuit diagram of a charging process of a passive RFID tag chip, wherein D is a diode of the tag chip, and C is a capacitor of the tag chip. The passive RFID tag continuously captures energy from the carrier waves for charging its own capacitor, and does not capture energy from the reader anymore after the charging process is completed (the voltage across the capacitor reaches the rated threshold $V_{max}$). According to the relevant standards, the charging process of the tag takes less than 2 ms, and it can be considered that once the reader is turned on, all the tags within the range have been charged. As shown in FIG. 2, if the reader is turned off at this time, a current is generated across the capacitor due to the potential difference, thus causing the voltage V across the capacitor to decrease continuously over time. In this process, the capacitor acts as an auxiliary power source to maintain the normal operation of the tag when its voltage V is greater than the threshold $V_0$. The diode has a blocking effect on the current during this process so that the time of the capacitor maintaining the operation of the circuit meets the relevant standards.

In this circuit, the diode D is very sensitive to the change of the outside temperature. Generally, with the increase of temperature, the number of free electrons in the diode increases correspondingly, which makes its blocking effect on the current smaller, and the current of the tag increases accordingly in the discharging process. This change results in a decrease in the maximum time T for the tag to maintain its own function after being powered off. That is, a larger value of T corresponds to a smaller discharge current, indicating a lower temperature. A smaller value of T corresponds to a larger discharge current, indicating a higher temperature. By observing this phenomenon, temperature detection can be achieved by indirectly sensing the temperature of the surrounding environment using the circuit characteristics of the passive RFID tag. Since the maximum discharging duration T is determined only by hardware characteristics of the tag, and is independent of environmental factors (e.g., the communication distance, the tag location, multipath effects), the temperature detection manner featured by the maximum discharging duration T is strongly robust against environmental changes compared with the existing method.

Figure 3:
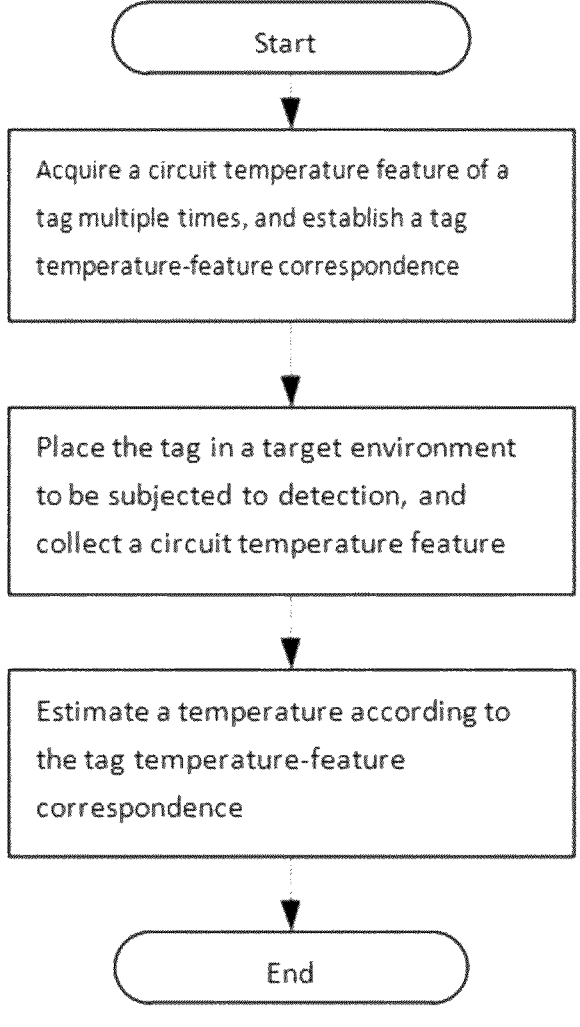
FIG. 3 is a flowchart of a temperature measurement method based on a passive RFID tag according to an embodiment of the present disclosure.

As shown in FIG. 3, a temperature measurement method based on a passive RFID tag according to an embodiment of the present disclosure includes: acquiring a circuit temperature feature of a tag multiple times, and establishing a tag temperature-feature correspondence; and estimating, by using the tag temperature-feature correspondence and the current circuit temperature feature of the tag, the temperature of an environment where the tag is located, wherein the circuit temperature feature of the tag is the maximum discharging duration within which a passive RFID tag can operate normally during a discharging process after the tag is fully charged and then powered off.

Specifically, the method may include: measuring the maximum discharging duration of the tag and recording the corresponding temperature value to form a feature set of two-element tuples; placing the tag in different temperature environments and repeating the above process to form a feature set of two-element tuples; performing least-squares fitting on the feature set of two-element tuples set to obtain a temperature-maximum discharging duration corresponding function; and placing the tag in an environment to be subjected to detection for measuring the maximum discharging duration of the tag again, and calculating using the temperature-maximum discharging duration corresponding function to obtain the ambient temperature.

In general, during the discharging process of the tag circuit, a discharge voltage curve can be obtained by detecting the voltage change across the circuit, and then the time when the voltage V decays from $V_{max}$ to $V_0$, i.e., the maximum discharging duration T, can be obtained. However, this approach requires the use of dedicated detection equipment, which affects the practicability of the method.

Preferably, the present disclosure utilizes the state presented by the flag of the tag as a reference for the electric quantity of the tag. Unlike non-volatile memory (e.g., NAND flash and solid state drives), the flag of the tag is a type of volatile memory that requires power to maintain the stored information, and the stored data is quickly lost once the power is cut off or the supply voltage is below a threshold. For passive RFID tags, the power of the tag is cut off after the reader is turned off, the capacitor circuit of the tag starts to discharge, and the flag state of the tag will fall back to the default state when the voltage V across the capacitor of the tag is less than $V_0$. Therefore, by checking the change of the flag state, the time point when the output voltage of the tag circuit decays to the threshold value $V_0$ can be determined, and then the persistence time T can be determined. The flag state of the tag can be freely retrieved by all commercial readers, thus ensuring the practicability of the present disclosure.

According to the production standards of RFID tags, an RFID tag has five flags, which are realized by volatile memory, namely, one selected flag (SL flag) and four inventoried flags corresponding to four sessions S0, S1, S2 and S3.

Figure 4:
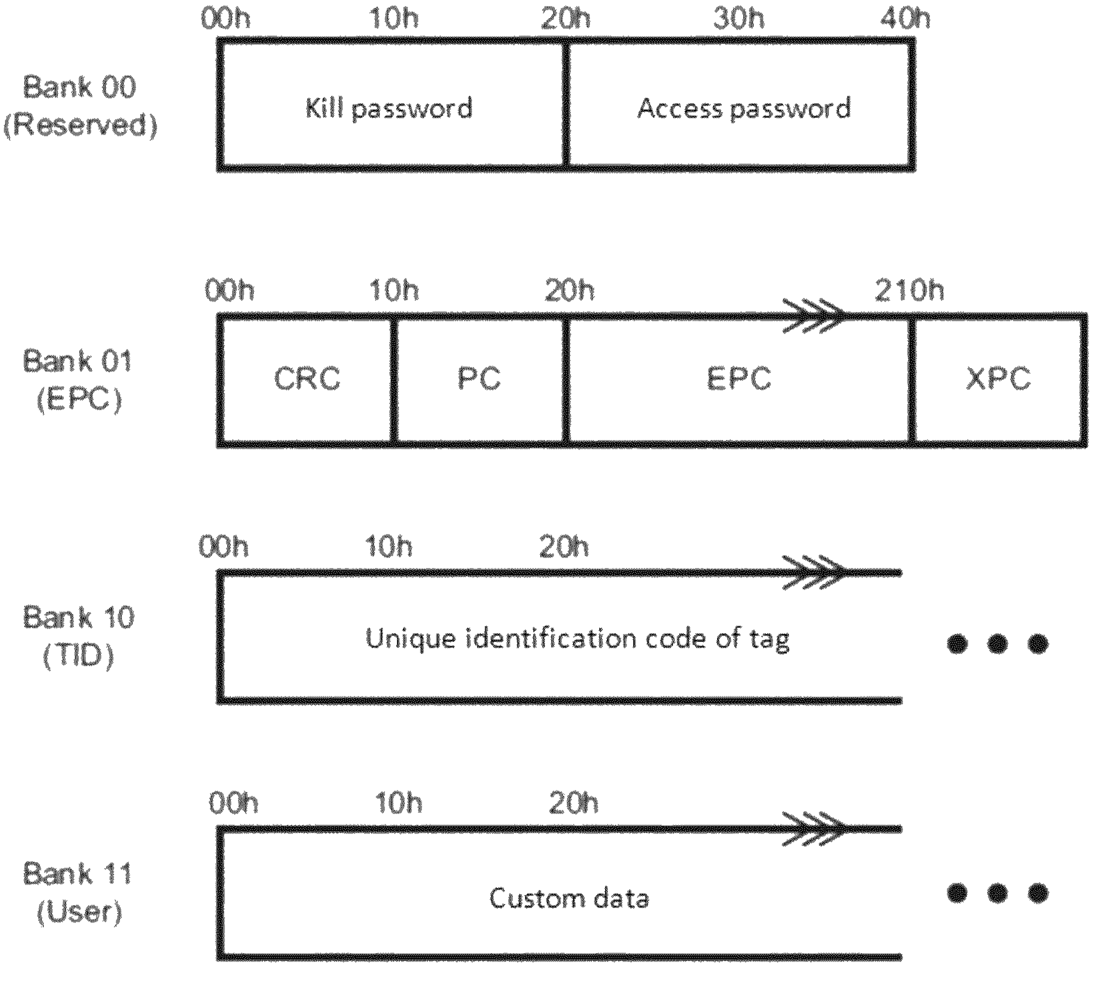
FIG. 4 is a logical memory structure of a tag.

A brief introduction of standard specifications for RFID tags will be made below. The internal storage space of a tag may be logically divided into four banks, namely a Reserved bank, an EPC bank, a TID bank, and a User bank, as shown in FIG. 4.

Reserved bank. The Reserved bank stores the inactivation password and the access password of the tag, and is used only when the inactivation operation and the encrypted access operation are performed on the tag. This bank occupies 64 bits in total.

EPC bank. The first 32 bits of the EPC bank store the tag control information, which is the cyclic redundancy check (CRC) result, the protocol-control (PC) word, and the extended protocol control (XPC) word, followed by the tag electronic product code (EPC), which can be modified by user programming to uniquely identify a tag. The EPC length is typically 96 bits, and the EPC length of some chips can reach 128 bits or even 496 bits.

TID bank. The TID bank stores the manufacturer information of the tag, tag type identification, and the unique identification code of the tag. The TID of each tag is globally unique. Unlike the EPC field, this bank has been set before leaving the factory and can no longer be modified by the user.

User bank. The User bank provides a complete logical space for users to store their own information.

In addition to the unified logical memory bank design, each tag supports four sessions at the same time, which are denoted by symbols S0, S1, S2 and S3, respectively. A tag will use one of the sessions in a round of communication with a reader, and multiple readers can communicate with the same tag at the same time by using different sessions. For example, while reader No. 1 communicates with the tag by using the session S0, reader No. 2 can also communicate with the tag by using the session S1.

Each session has a corresponding inventoried flag to reflect the current inventory state of the tag. The value of the inventoried flag is either A or B, and the values of A and B will be affected by the command of the reader and will be interchanged as the state of the tag changes, which is called state flipping. Every time the tag completes a round of communication, the flag of the current session will flip. The flag is denoted as A→B from A to B and B→A from B to A. An important purpose of the session is to enable a tag to maintain an independent state (A or B) for each communication when communicating with multiple readers simultaneously.

In addition to the four inventoried flags corresponding to the four sessions, each tag also has a special bit—the selected flag (SL flag). The selected flag is functionally similar to the other inventoried flags, and also has two opposing states, which are denoted by SL, ~SL, respectively.

When the tag gets energy, the S0 flag is always set to A, the inventoried flag states of other sessions are initialized to A or B according to the command of the reader, and the selected flag is initialized to SL or ~SL. After the tag completes a round of communication with the reader, the inventoried flag will automatically flip to the opposite state to indicate that the tag has been inventoried. In addition to automatically flipping after the tag is inventoried, each flag also has a corresponding de-energized persistence time, i.e., the time the tag can maintain its own flag state after losing the energy supplied by the carrier waves from the reader. Taking the inventoried flag as an example, the state B needs to be maintained at a high electric level, and when the internal power of the tag is exhausted, the tag will be initialized to the state A. The time span from the tag starting to de-energized to the state of the inventoried flag being B→A is the de-energized persistence time, and the specific values are shown in Table 1. Once the corresponding persistence time has elapsed after the tag is de-energized, the flag will fall back to the default state. The default state of the inventoried flag is A, and the default state of the selected flag is SL.

TABLE 1

| Flag | Energized persistence time | De-energized persistence time |
|---|---|---|
| S0 inventoried flag | Indefinite | None |
| S1 inventoried flag | 500 ms-5 s | 500 ms-5 s |
| S2 inventoried flag | Indefinite | Greater than2 s |
| S3 inventoried flag | Indefinite | Greater than 2 s |
| SL selected flag | Indefinite | Greater than 2 s |

As can be seen from Table 1, the de-energized persistence time of the S2 inventoried flag, the S3 inventoried flag, and the SL selected flag is greater than 2 s, the persistence time of the S1 inventoried flag is between 500 ms and 5 s, and S0 has no de-energized persistence time (i.e., being always maintained at the state A). Thus, the persistence time T of the tag can be obtained by measuring the de-energized persistence time of the S1 inventoried flag, the S2 inventoried flag, the S3 inventoried flag, and the SL selected flag. Specifically, the S1 inventoried flag, the S2 inventoried flag, or the S3 inventoried flag may be set to the state B, the transition of the inventoried flag from B to A can be observed after the tag is de-energized; alternatively, the SL selected flag is set to the ~SL state, and the transition of the SL selected flag from ~SL to SL is observed after the tag is de-energized.

Figure 5:
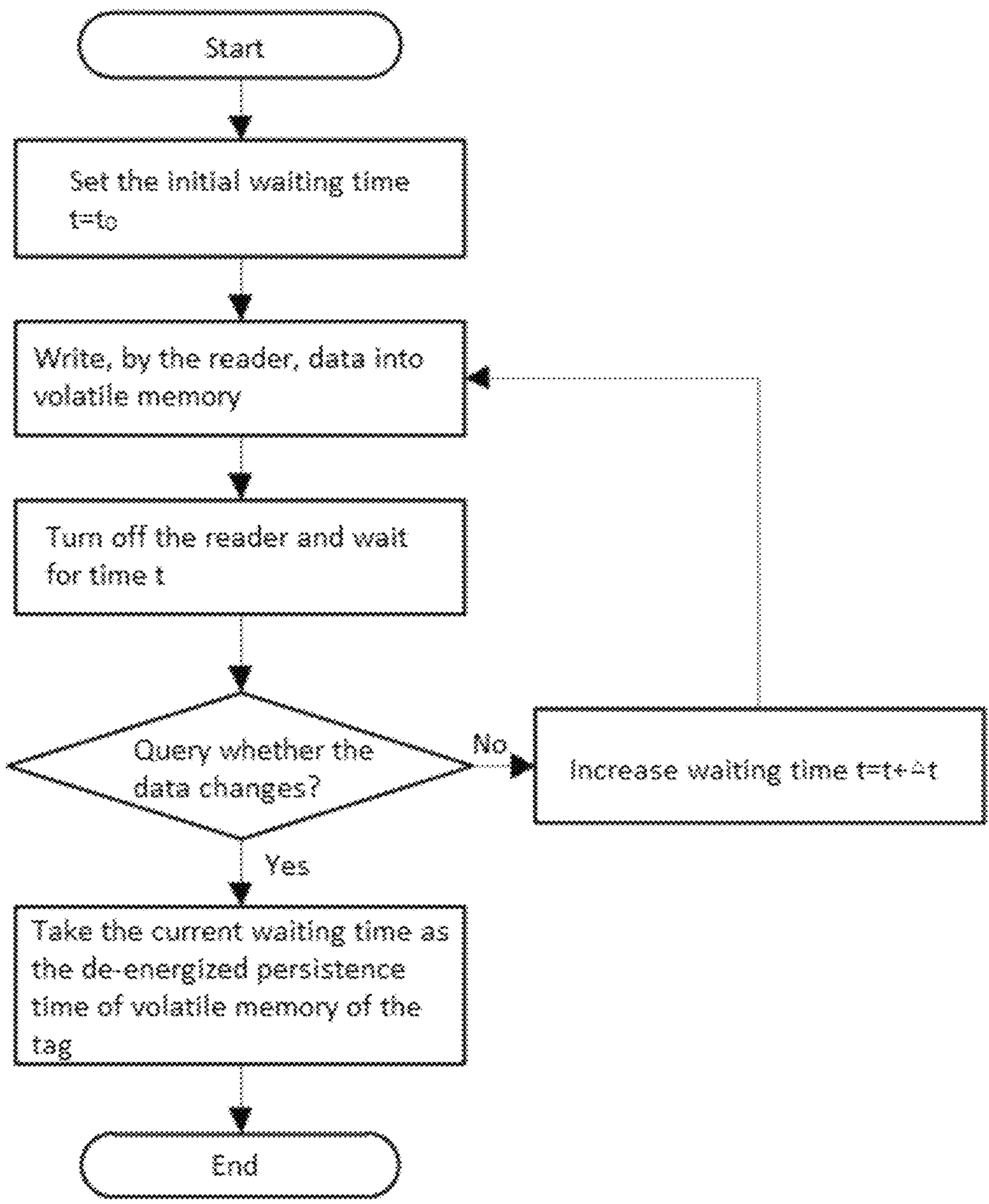
FIG. 5 is a flowchart of a method for measuring the de-energized persistence time of volatile memory of a tag according to another embodiment of the present disclosure.

As shown in FIG. 5, another embodiment of the present disclosure further provides a method for measuring the de-energized persistence time of volatile memory of the tag, including the following steps:

writing data into the volatile memory of a tag by the reader, wherein the volatile memory requires electrical power to maintain data states; turning off the reader, and querying the data of the volatile memory after the waiting time t, if the data changes, taking the current waiting time as the de-energized persistence time of the volatile memory; if the data does not change, updating the waiting time t with a time step length Δt, and returning to the operation of writing data until the waiting time corresponding to the data change is obtained.

The operations of writing, by the reader, data into the volatile memory of the tag and querying the data of the volatile memory are both performed by means of communication between the reader and the tag. The specification of the communication between the reader and the tag will be described below.

A complete communication process between the reader and the tag is called one cycle, and in each round the reader first selects a target tag set from all tag sets according to the requirements, and only communicates with the target tag set to obtain basic information such as the EPC of the tag. Further, the reader can also perform complex operations such as reading and writing on the tag.

Figure 6:
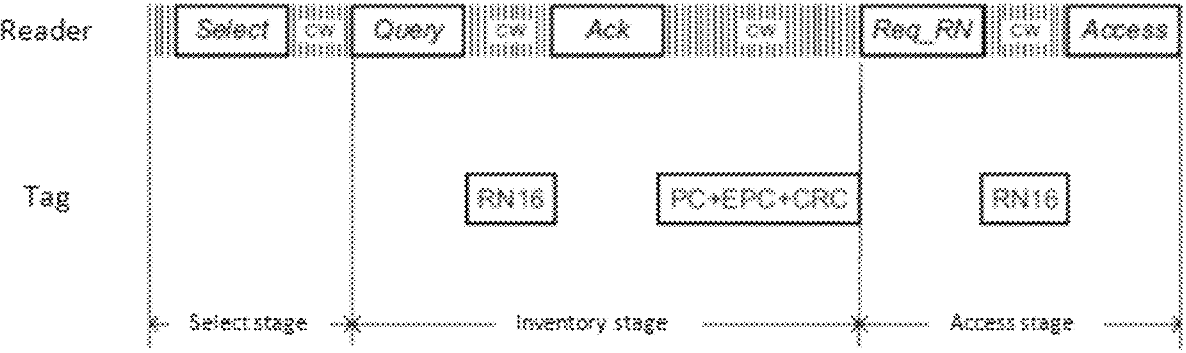
FIG. 6 is a round of communication process of a reader with a tag.

Each round of communication consists of three stages: Select stage, Inventory stage and Access stage. At each stage the reader sends a corresponding command and the tag responds to the command of the reader according to its own state. FIG. 6 shows a typical round of communication between a reader and a tag. The Select stage and the Inventory stage, which are highly relevant to the present disclosure, will be described below.

(1) Select Stage

The Select stage is the first stage of a round of communication between the reader and the tag. In this stage, the goal of the reader is to divide the tag sets into two categories: matched tag sets and unmatched tag sets. In conjunction with the commands associated with the Inventory stage, the target tag set is finally selected. These tags will participate in the interaction with the reader in the inventory stage, while those tags which are not selected remain silent in the later stage and do not respond to any commands.

In the select stage, there is only one mandatory command, Select, which all readers must implement. The structure of the Select command is shown in Table 2.

TABLE 2

| | Command | Target | Action | MemBank | Pointer | Length | Mask | Truncate |
|---|---|---|---|---|---|---|---|---|
| Description | 1010 | 000: S0 | See Table 3 | 00: RFU | Mask start position | Mask length | Mask value | 0: Truncate disabled |
| | | 001: S1 | | 01: EPC | | | | 1: Truncate enabled |
| | | 010: S2 | | 10: TID | | | | |
| | | 011: S3 | | 11: User | | | | |
| | | 100: SL | | | | | | |

The Select command has a total of seven fields, among which six fields of high relevance to the present disclosure will be described below:

MemBank, Pointer, Length and Mask

How to select a matched target tag set is jointly determined by the four fields, which are MemBank, Pointer, Length and Mask. MemBank in the Select command specifies the logical memory banks for comparison, and the allowed banks in the command may be the EPC bank, the TID bank and the User bank; Pointer points to the starting position of the comparison banks; Length specifies the number of bits of a bit string for comparison. MemBank, Pointer and Length can uniquely identify a block of memory bank of the tag, e.g., (MemBank=$01_2$, Pointer=32, Length=96) represents that the EPC bank is selected, starting from the 32nd bit of the memory bank (i.e., the starting position of the EPC field in the EPC bank), and the length of the memory bank is 96 bits. If the contents of the selected memory bank exactly coincide with the mask value (Mask) in the command, the tag is matched, otherwise the tag is not matched.

Target Field and Action Field

After the target tag set matched with the mask is selected (the tag sets not matched are also selected), the Target field and the Action field together specify the action to be performed on the tag set. The Target field in the Select command specifies the session to be used by the reader in communications. For example, Target=$010_2$ indicates that the reader selects the S2 session. In addition to the four sessions, the reader may also use an additional selected flag SL.

The Action field represents the action to be performed on the target flag, as detailed in Table 3, in which eight operations are defined. For example, when Target=$010_2$, Action=$000_2$, a tag set matched with the mask will set its own S2 inventoried flag to A, and a tag set not matched with the mask will set its own S2 inventoried flag to B; when Target=$100_2$, Action=$000_2$, the set matched with the mask will set its own selected flag to SL, the set not matched with the mask will set its selected flag to ~SL; the above actions are symbolized as AB.

TABLE 3

| | Action | Mask matching | Mask not-matching | Symbolization |
|---|---|---|---|---|
| Description | 000 | →SL\|→ A | →~SL\|→ B | AB |
| | 001 | →SL\|→A | Ignore | A— |
| | 010 | Ignore | →~SL\|→ B | —B |
| | 011 | SL↔~SL\|A↔B | Ignore | S— |
| | 100 | →~SL\|→B | →SL\|→A | BA |
| | 101 | →~SL\|→B | Ignore | B— |
| | 110 | Ignore | →SL\|→A | —A |
| | 111 | Ignore | SL↔~SL\|A↔B | —S |

In summary, the reader can classify the tag sets into two categories that perform different actions by controlling the six fields including MemBank, Pointer, Length, Mask, Target and Action together.

(2) Inventory Stage

The reader does mainly two tasks in the Select stage, one is to classify the tag sets into two categories based on whether the masks match or not, and the other is to set the state of the flags of the two categories of tags by specifying actions. After the Select command, the reader continues to transmit the carrier waves to provide energy for the tag in preparation for entering the Inventory stage.

The Inventory stage contains five commands: Query, QueryAdjust, QueryRep, ACK and NAK, which are all mandatory commands. In the Inventory stage, the reader communicates with the tags to obtain EPC information for all tags in the target tag set, which is called inventory. After inventory, the inventoried flag of the tag will flip. That is, in a round of Inventory stage, tags are inventoried at most once.

A typical process of the Inventory stage is shown in FIG. 6. The reader first sends a Query command, and the target tag returns an RN16 random number by backscattering after receiving the command. Upon receipt of the response from the tag, the reader sends an ACK command with the same RN16 to inform the tag to start transmitting data. Upon receipt of a valid acknowledgement, the tag sends its PC, EPC and CRC information to the reader. Through the above process, the reader successfully obtains the information of the tag.

The Query command means the start of a new round of Inventory stage. A complete Query command has a total of eight fields that, in addition to specifying the physical layer information that tags need to follow to respond, ultimately determine which tags will participate in the response. Three fields of high relevance to the present disclosure will be described below:

Sel (Select), Session and Target

On the basis of the Select command, Sel, Session, and Target jointly determine the target tag set that truly participate in the response. The Session in the Query command always coincides with the Target in the Select command, indicating that the session used by the reader and the tag in this round of communication is S0, S1, S2 or S3. The Sel in the Query command indicates the state of the selected flag that the target tag set should have, e.g., Sel=$00_2$ indicates that tags with either the selected flag SL or ~SL have a chance to participate in the response, and Sel=$11_2$ indicates that only tags with the selected flag state SL are likely to participate in the response. Similar to the Sel, the Target in the Query command makes a further selection of the session field flag of the tag, e.g., Target=$1_2$ indicates that only tags with a session inventoried flag being B are likely to participate in the response. In general, only the tags matched with the Sel and the Target in the Query command simultaneously are likely to participate in the next inventory. The values for each field are shown in Table 4.

TABLE 4

| | Command | Sel | Session | Target |
|---|---|---|---|---|
| Description | 1000 | 00: ALL<br>01: ALL<br>10: ~SL<br>11: SL | 00: S0<br>01: S1<br>10: S2<br>11: S3 | 0: A<br>1: B |

In summary, the target tag set that participates in the response can be truly selected only by combining the Select command and the Query command, while the remaining tags will remain silent in the Inventory stage.

An example of implementing the solution of the present disclosure based on the Select command and the Query command will be described in detail below.

The Select command is written later in the following format:

$$S(\underbrace{t}_{Target},\overbrace{a}^{Action},\underbrace{b}_{Membank},\overbrace{p}^{Painter},\underbrace{t}_{Length},\overbrace{k}^{Mask})$$

(1)

Taking the S1 inventoried flag as an example (S2 inventoried flag, S3 inventoried flag, and SL flag may operate in a similar manner, only the commands used are slightly different, and will not be described again), the reader broadcasts a Select command that causes the tag with EPC being id to set the S1 inventoried flag to B and the other tags to set the S1 inventoried flag to A:

$$\text{Flag} \leftarrow BA{:}S(1,4,1,32,96,id) \tag{2}$$

Since the charging time of the tag should not exceed 2 ms, which is much shorter than the time (about 20 ms) that the Select command is broadcast, in other words, once the Select command in (2) is executed, the inventoried flag of the target tag is set to B, and the capacitor of the tag is also fully charged.

Thereafter, the tag is brought into a discharging process by turning off the reader. After a waiting time t has elapsed, the reader broadcasts a Query command to check if there is a tag with an S1 inventoried flag of B. The Query command is as follows:

$$\text{Query } B{:}Q(\text{Session}=1,\text{Target}=1,Sel=0) \tag{3}$$

If a tag responds, it means that the de-energized persistence time of the tag is longer than t. In this case, it is necessary to increase t by a small step length Δt, and then repeat the above selection and query processes again until no tag responds (meaning that power is used up and the inventoried flag of the tag has changed to A), and the waiting time at this point is taken as a measured value of the S1 inventoried flag de-energized persistence time of the tag.

For the session S1, since the de-energized persistence time is limited to between 500 ms and 5 s, t can be initialized to 500 ms and gradually increased by one step length Δt until no tag responds. The selected step length Δt requires a balance of detection accuracy and detection efficiency, a small Δt will increase the number of tries, resulting in an increase in the time to acquire a single tag temperature feature, but increases the detection accuracy, and a large Δt increases the detection efficiency, but decreases the detection accuracy. In actual use, the value of Δt can be modified by the user as desired.

This previous example realizes the acquisition of the de-energized persistence time of a single tag within the range of the reader. In practical situations, it is often necessary to verify multiple tags at one time. An intuitive solution is to perform feature acquisition on all tags in turn, which is feasible but inefficient, wherein the broadcasting of the Select and execution of a Query operation takes only a few milliseconds, with most of the time overhead coming from the try waiting time t. If multiple tags are allowed to wait at the same time, the execution time is drastically reduced, and therefore, in order to increase the efficiency of temperature detection, parallel processing is employed for the multi-tag case.

Figure 7:
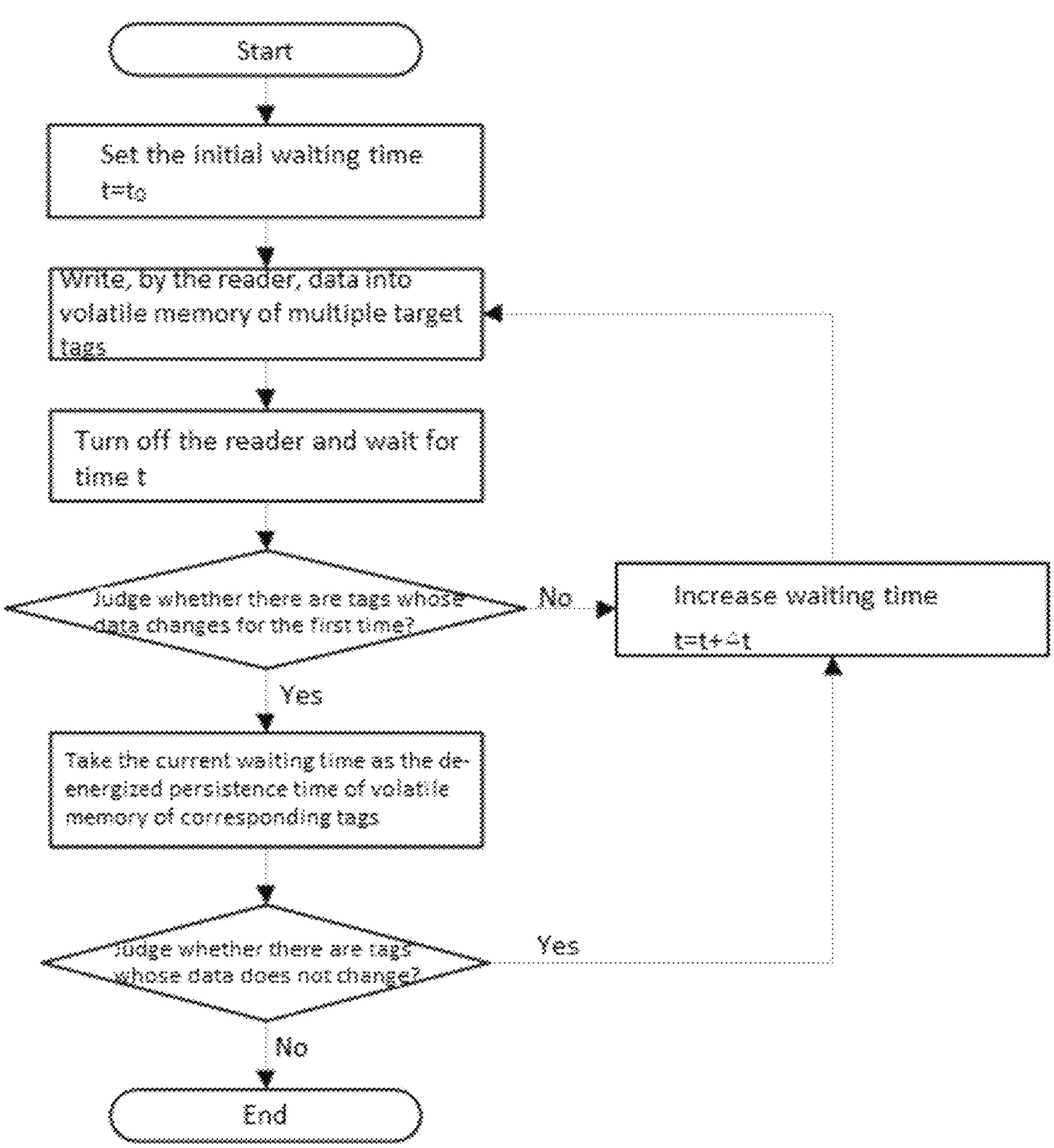
FIG. 7 is a flowchart of a method for measuring the de-energized persistence time of volatile memory of multiple tags in parallel according to another embodiment of the present disclosure.

As shown in FIG. 7, there is provided a method for measuring the de-energized persistence time of multiple tags in parallel, including the following steps:

writing data into the volatile memory of multiple target tag by the reader, wherein the volatile memory requires electrical power to maintain data states;

turning off the reader, and querying the data of the volatile memory after the waiting time t, if there are tags whose data changes for the first time, taking the current waiting time as the de-energized persistence time of the volatile memory of the corresponding tags; if there are no tags whose data changes, updating the waiting time t with a step length Δt, and returning to the operation of writing data;

if there are tags whose data does not change, updating the waiting time t with a step length Δt, and returning to the operation of writing data until the de-energized persistence time of the volatile memory of all the target tags is acquired.

Taking the inventoried flag as an example, first, instead of processing individually one tag at one time, the inventoried flags for all the target tags are set to state B; afterwards, these target tags enter a discharging process with energy being gradually consumed; after the waiting time t, a tag with an inventoried flag of B is queried, if the tag does not respond, the de-energized time of the tag is then determined as the current waiting time t (if the de-energized time of a certain tag has been acquired in the previous process, for a longer waiting time t, the tag will certainly not respond, but the waiting time t is not taken as the de-energized time of the tag, but only the corresponding waiting time when the tag does not respond for the first time is taken as the de-energized time of the tag, which should be readily understood); the waiting time t is updated, and this process is repeated until all the target tags have been measured.

By this approach, the long-term discharging process of the tag is executed in parallel, which reduces a lot of time overhead. Experiments show that if 10 tags need to be measured, this approach can eliminate about 90% waiting time.

Specifically, assuming there are n tags, wherein m tags are target tags, and these m tags can be separated from the entire tag set by m select commands:

$$\text{①}\ t_1 \leftarrow BA{:}S(2,a=4,1,32,96,id_1)$$

$$\text{ⓘ}\ t_1 \leftarrow B-{:}S(2,a=5,1,32,96,id_i),\ i \in [2,m] \tag{4}$$

First, the first tag $t_1$ is set using Action=BA, i.e., the S2 inventoried flag of $t_1$ is set to B, and the S2 inventoried flags of the other tags are set to A; then, for the i-th tag $t_i$, Action is set to B−, this operation sets the S2 inventoried flag of the tag $t_i$ to B, but does not change the settings of the other tags.

The measurement method described above requires constant adjustment of the waiting time t, repeating the select-query operation, which is time-consuming. For example, assuming the de-energized persistence time of a tag is 3 s, the waiting time t is initialized to 0.5 s, and a step length is 0.1 s, the foregoing method requires iterative tries of 0.5 s, 0.6 s, 0.7 s, . . . , 3.0 s, and all the waiting time is summed to 45.5 s. This is acceptable for some applications without real-time requirements, but where real-time requirements are high, the time is too long to meet the use requirements.

The root cause of the time inefficiency is that after the waiting time t has been updated, it is necessary to reset all the tags and try the new waiting time. Efficiency will be greatly improved if measurements need to be made within only one waiting time window. After extensive experimentation, it has been found that the query command does not charge the tag in the session S1, in other words, the query command can continue to query other tags after querying a tag during the discharging process without resetting the tag and turning off the reader.

Figure 8:
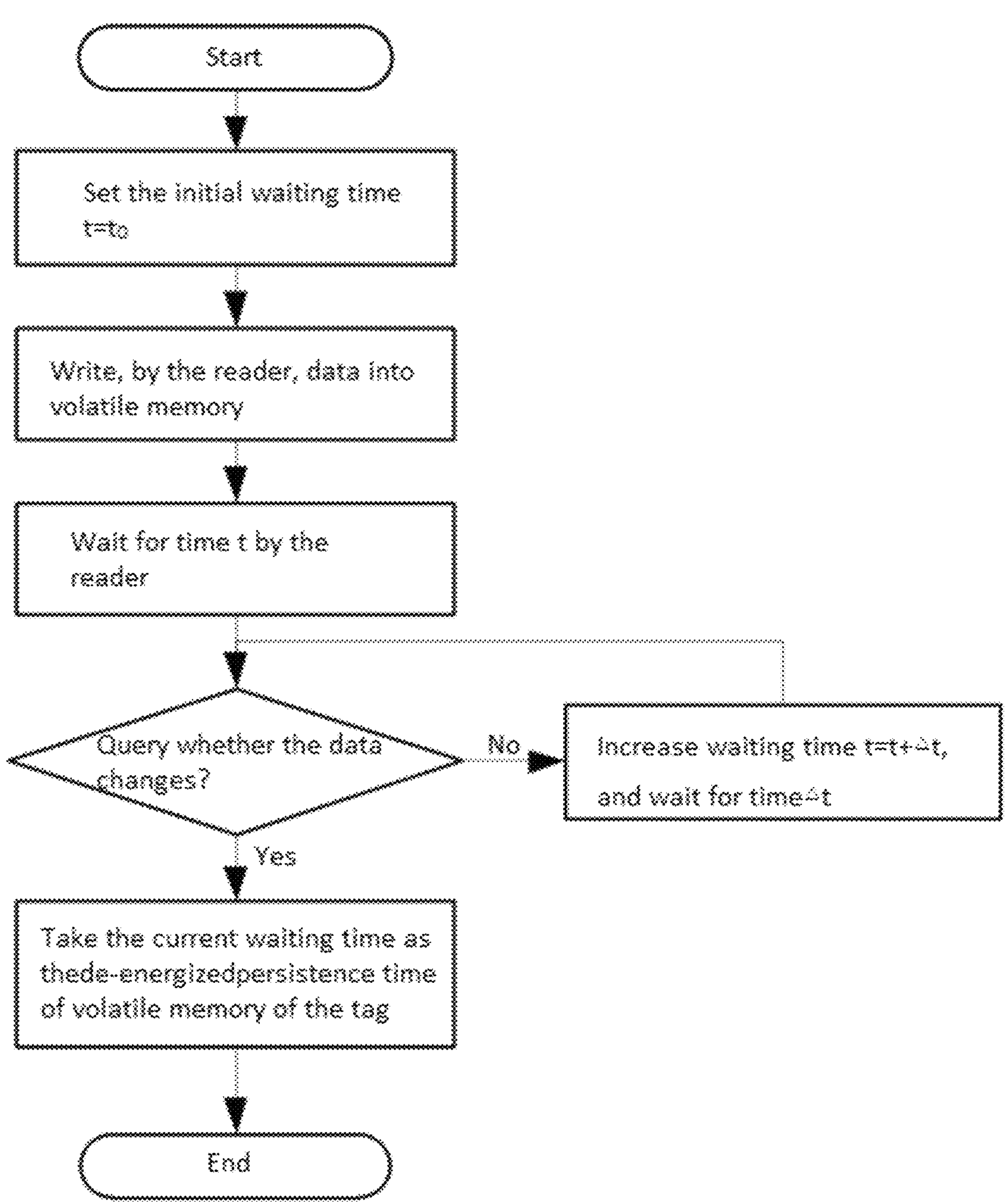
FIG. 8 is a flowchart of a method for measuring the de-energized persistence time of volatile memory of a tag based on an S1 inventoried flag according to another embodiment of the present disclosure.

As shown in FIG. 8, another method for measuring the de-energized persistence time of the tag is provided, including the following steps:

writing data into the volatile memory of the tag by the reader, wherein the volatile memory requires electrical power to maintain data states;

- querying, by the reader, the data of the volatile memory continuously until the data changes, and taking the waiting time for waiting for the data change as the de-energized persistence time of the volatile memory;
- wherein the volatile memory is the S1 inventoried flag.

Specifically, the persistence time of the tag $t_1$ may be measured as follows: first, the reader broadcasts the Select command in formula (2) to set the S1 inventoried flag of the tag $t_1$ to B; then, the discharging process of the tag starts, and the reader queries the tag with the S1 inventoried flag being A. The query command is:

$$\text{Query } A{:}Q(\text{Session}=1,\text{Target}=0,Sel=0) \tag{5}$$

During the discharging process, the internal capacitor is initially used for energizing the tag to keep the S1 inventoried flag remaining B, so the reader cannot get any response from tag $t_1$; when the power level is too low to maintain the information of the volatile memory, the S1 inventoried flag will fall back to the initial state A, at this time, since the reader constantly query tags with the S1 inventoried flag being A, the tag $t_1$ satisfying this condition will respond to the reader, and the time span from the start of discharging to the response from the tag is the de-energized persistence time of the S1 inventoried flag of the tag $t_1$.

Obviously, this approach eliminates the need to try different waiting time and measures the de-energized persistence time within only one time window, thus reducing a lot of overheads. For example, assuming the above tag has ade-energized persistence time of 3$s$, this approach brings a tremendous performance improvement compared with the previous approach, reducing the waiting time from 45.5 s to only 3 s.

After responding to the reader, the tag flips its S1 inventoried flag from A to B according to the rules of the standard specification; meanwhile, the capacitor is fully charged. With the reader continuing to query A, the tag will respond after another de-energized persistence time, and therefore, if multiple measured values of the de-energized persistence time are needed, only the time interval between two consecutive responses of the tag needs to be recorded. In fact, the measurement method can also be simplified by deleting the select command, i.e., the reader goes directly to the Inventory stage.

Figure 9:
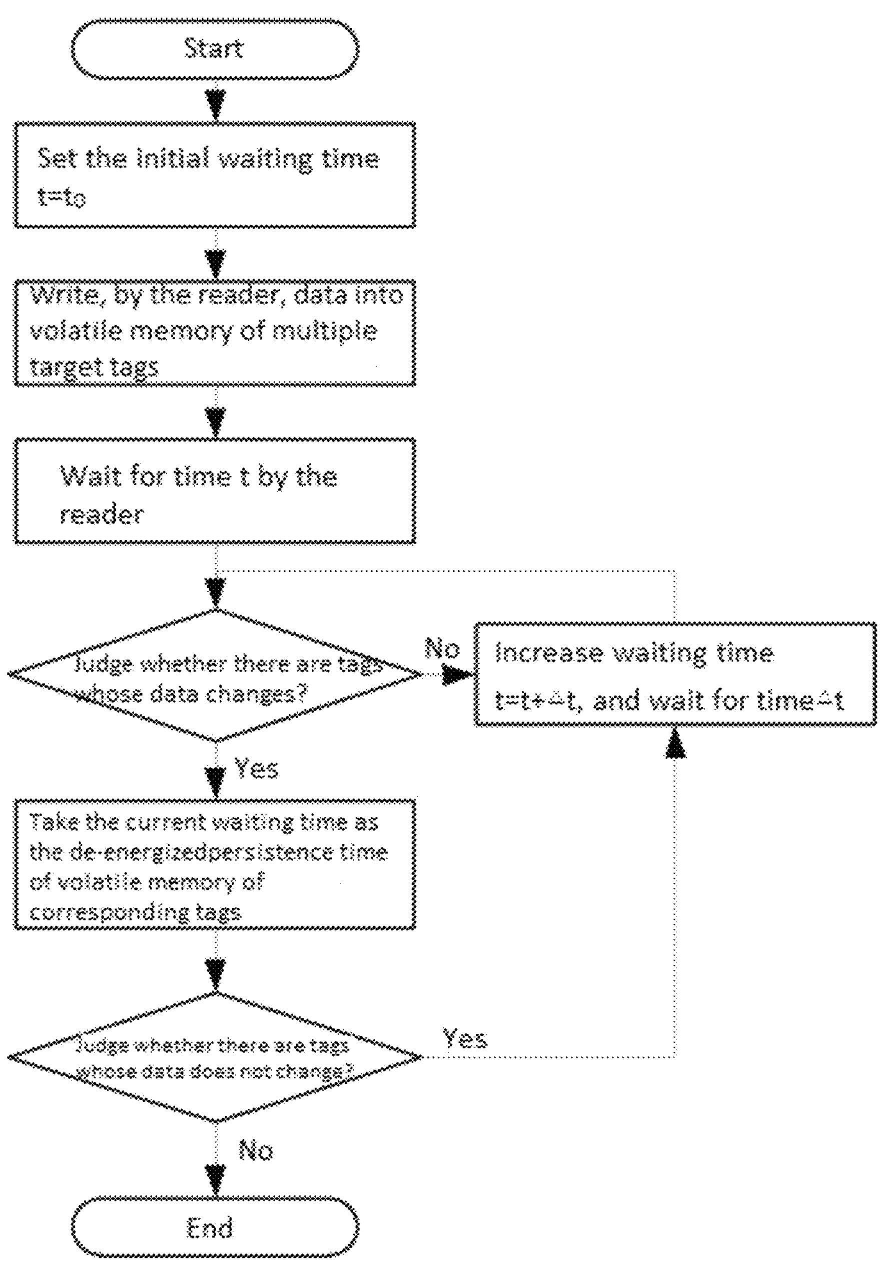
FIG. 9 is a flowchart of a method for measuring the de-energized persistence time of volatile memory of multiple tags in parallel based on an S1 inventoried flag according to another embodiment of the present disclosure.

In addition, this measurement approach may be easily extended to the multi-tag case, and as shown in FIG. 9, there is provided a method for measuring the de-energized persistence time of multiple tags in parallel based on the S1 inventoried flag, including the following steps:

- writing data into the volatile memory of multiple target tag by the reader, wherein the volatile memory requires electrical power to maintain data states;
- querying, by the reader, the data of the volatile memory continuously, if there are tags whose data changes, taking the current waiting time as the de-energized persistence time of the volatile memory of the corresponding tags until the de-energized persistence time of the volatile memory of all the target tags are acquired;
- wherein the volatile memory is the S1 inventoried flag.

The most major challenge facing multi-tag simultaneous measurement is channel contention between tags. When the number of target tags is small (less than 10), the higher sampling frequency of commercial readers can support simultaneous measurement of the de-energized persistence time of all the tags. However, when the reader needs to detect an excessive number of tags (greater than 10), the channel contention between tags can cause their response time to be later than the actual de-energized persistence time of the S1 inventoried flag, causing measurement errors. To overcome this problem, the present disclosure mitigates the effects of channel contention on parallel measurement by dividing a large tag set into a number of subsets containing a small number of tags and measuring the subsets separately.

Specifically, assuming that the tag set is $\tau$, and $\tau' \subseteq \tau$ is an unmeasured tag subset of $\tau$, and $\tau-\tau'$ is used to represent tag sets other than the unmeasured tag subset in the tag set $\tau$; when a select command is used to set the S1 inventoried flag of a tag in $\tau'$ to B and the S1 inventoried flag of a tag in $\tau-\tau'$ to A, when a reader subsequently queries the tags with the S1 inventoried flags being A, and the tags in $\tau-\tau'$ will participate in the response, so that the response of the tags in $\tau'$ will not be available to the reader in time. Initially setting the S1 inventoried flag of tags in$\tau-\tau'$ to B also does not work, since these tags will also participate in the response when the S1 inventoried flag fall back to A. To solve this problem, the S1 inventoried flag and the SL flag may be used in combination to eliminate the interference of tags in $\tau-\tau'$. A specific way is as follows: the reader selects an unmeasured tag subset $\tau'$ from the tag set t, sets the selected flag of the tags in $\tau'$ to SL, and the selected flag of tags in $\tau-\tau'$ to SL; and only tags with SL flags are allowed to participate in the response during the Inventory stage.

In this way, even if the S1 inventoried flag of a tag in $\tau-\tau'$ is A, commands querying a tag with an S1 inventoried flag of A must remain silent. Specifically, assume $\tau'=\{t_1, t_2, \ldots, t_m\}$. The reader broadcasts a select command as follows:

$$\textcircled{\small l}\; t_1 \leftarrow AB{:}S(t=x=4,0,1,32,96,id_1).$$

$$\textcircled{\small i}\; \leftarrow A-{:}S(t=4,1,1,32,96,id_i),1\in[2,m] \tag{6}$$

First, the selected flag of tag $t_1$ is set to SL, while the selected flags of other tags are set to SL; then, for the i-th tag $t_i$, the selected flag is set to SL, but the settings of the other tags are not changed. Thus, the selected flag of the tag in $\tau'$ is set to SL and the selected flag of the tags in $\tau-\tau'$ is set to SL.

Thereafter, the Inventory stage is entered using the query command:

$$\text{Query } A \;\&\; SL{:}\; Q(1,\text{Target}=0,Sel=3) \tag{7}$$

The reader queries tags with the S1 inventoried flag being A, and selects only tags with the flag SL to participate in the response, in which case only tags in $\tau'$ have a chance to respond. For any target tag, the time interval between two adjacent responses is recorded as the de-energized persistence time for the S1 inventoried flag of this tag.

The above process is repeated and the reader continually selects a new unmeasured tag subset $\tau'$ for measurement until the de-energized persistence time of the S1 inventoried flags of all the tags in $\tau$ is found.

In the above manner, the de-energized persistence time of the S1 inventoried flag of one tag or multiple tags can be measured simultaneously, thus improving the time efficiency of the method.

Now how to obtain persistence time T of the tag has been given, how to use T for temperature measurement will be given below.

Figure 10:
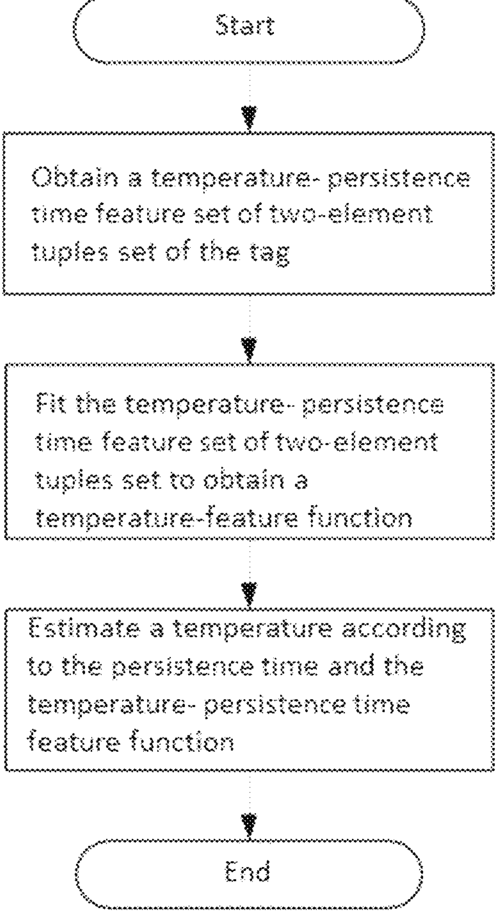
FIG. 10 is a flowchart of a method for temperature measurement by individual calibration of a tag according to an embodiment of the present disclosure.

As shown in FIG. 10, there is provided a method for acquiring a temperature-persistence time feature function based on least-squares fitting for temperature measurement, including the following steps:

- measuring the persistence time of a tag at different temperatures, and forming a temperature-persistence time feature set;

solving the temperature-persistence time feature set using a least squares method to obtain a temperature-persistence time feature function of the tag; and placing the tag in an environment to be subjected to detection for measuring the persistence time of the tag, and obtaining the temperature of the corresponding environment according to the temperature-persistence time feature function.

Specifically, the operating interval of the RFID tag is −40° C. to 85° C. Any of these ranges may be selected as the temperature detection interval according to requirements. Typically, the persistence time is measured in the step length Δk, taking from 0° C. to 85° C. as an example. Assuming a step length Δk of 5° C., the persistence time of the tag at 0° C., 5° C., . . . , 85° C. is measured in sequence, and the persistence time and the temperature form a feature set of two-element tuples. It should be noted that ca smaller step length can improve the model accuracy but increases the number of tries required, which can be adjusted according to requirements in practical situations.

Figure 11:
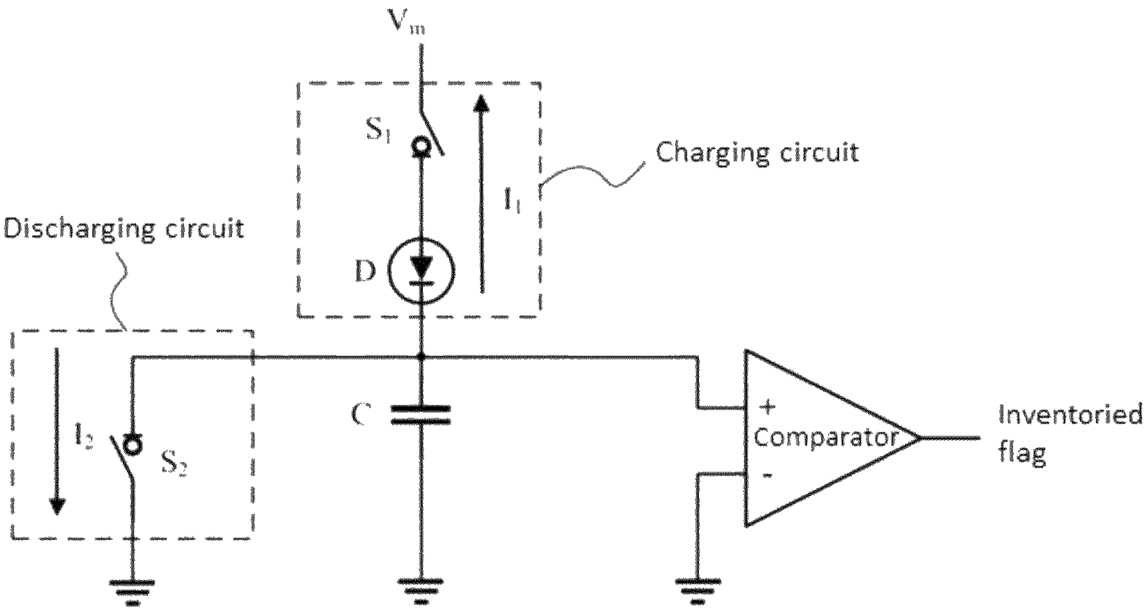
FIG. 11 is an equivalent circuit diagram of volatile memory of a tag.

After obtaining a feature set of two-element tuples from the tag, the present disclosure obtains, in conjunction with the tag circuit, a function relationship between the persistence time T and the temperature k. The present disclosure detects the persistence time of the tag through the inventoried flag of the tag. FIG. 11 shows an equivalent circuit diagram of an inventoried flag of an RFID tag. The equivalent circuit consists of two parts, including a charging circuit and a discharging circuit. When the reader energizes the circuit, switch $S_2$ is open and $S_1$ is closed. The external circuit charges the capacitor through the charging circuit so that the voltage across the capacitor reaches a maximum value of $V_{max}$. Switch $S_2$ is closed after the start of the discharging process. The tag circuit generates a discharge current under the action of the potential difference. Part of the current passes through a diode D and is denoted as $I_1$. As previously described, the current $I_1$ is temperature dependent and may be expressed as $$I_1 = I_0 \sqrt[c]{2}^k,$$

wherein k is the current temperature in degrees Celsius and $I_0$ is the current magnitude corresponding to 0° C. $I_2$ is a fixed current and used to control the de-energized persistence time of the inventoried flag to comply with the protocol standard. According to the above model, the persistence time T of the tag may be expressed as:

$$T(k) = \frac{Q}{I_1 + I_2} = \frac{CV_{in}}{I_0 \sqrt[c]{2}^k + I_2} \tag{8}$$

wherein Q is the charge across the capacitor, C is the capacitance value of the capacitor, and $V_{in}$ is the input voltage of the circuit. Taking a series of formula transformations, the formula can be further expressed as:

$$T(k) = \frac{a}{\sqrt[c]{2}^k + b} \tag{9}$$

wherein parameter $$a = \frac{CV_{in}}{I_0},$$

and parameter $$b = \frac{I_s}{I_0}.$$

Parameters a, b and c are tag hardware dependent variables that can be fitted according to the feature set of two-element tuples by an optimization method such as a least squares method or a genetic algorithm. Taking the least squares method as an example, assuming that through multiple trials, the feature set of n two-element tuples $\{(T_1, k_1), (T_2, k_2), \ldots, (T_n, k_n)\}$ of the target tag have been obtained, wherein $(T_i, k_i)$ represents that the persistence time acquired at temperature $k_i$ is Ti, wherein 1≤i≤n. Then the parameters a, b and c can be obtained by solving the following least squares problem:

$$\min_{a,b,c} \sum_{i=1}^{n} \left\| T_i - \frac{a}{\sqrt[c]{2}^{k_i} + b} \right\|^2. \tag{10}$$

By solving the problem, the parameters a, b and c that minimize the difference of the acquired data from the theoretical function can be obtained. By using these parameters, the following temperature solving formula can be obtained:

$$k = \frac{\ln\left(\frac{a}{T} - b\right)}{\ln\left(\sqrt[c]{2}\right)} \tag{11}$$

The temperature of the environment where the tag is located can be estimated by substituting the persistence time T acquired in the actual scenario to eventually reach the design function.

Besides the least squares method, other fitting manners can of course be used and will not be described further here.

Resolving the parameters separately for each tag requires a larger number of tries. The present disclosure proposes a coarse grained way, sacrificing some accuracy to save the time required for calibration (solving the parameters a, b and c). It has been found experimentally that different tags of the same model have very similar persistence time at the same temperature due to being similar in structure and production process. Thus, the temperature-persistence time feature function can be derived from a small number of tags, which can be used by other tags of the same model.

Figure 12:
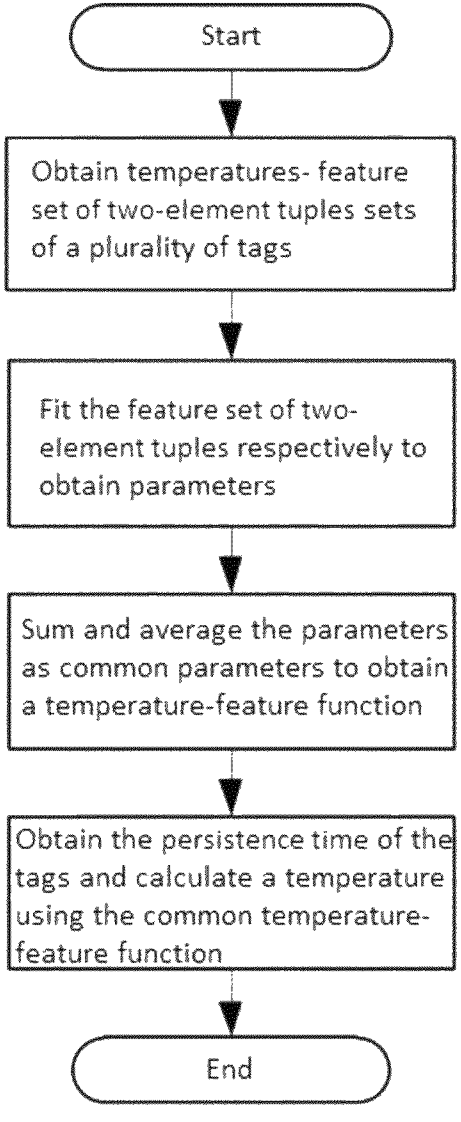
FIG. 12 is a flowchart of a method for co-calibration of multiple tags for temperature measurement according to an embodiment of the present disclosure.

As shown in FIG. 12, a temperature measurement method based on a multi-tag common temperature-persistence time feature function is provided, including the following steps:

acquiring the persistence time of a plurality of tags of the same model multiple times, and forming a feature set of two-element tuples from the persistence time and the temperature;

using the feature set of two-element tuples of each tag together with the least squares method to obtain parameters a, b and c, respectively;

summing and averaging the three parameters a, b and c of all the tags separately to obtain common parameters a', b' and c' for constructing a common temperature-persistence time feature function; and placing the tags in environments to be subjected to detection, and obtaining the temperature of the corresponding environment using the common temperature-persistence time feature function and the persistence time.

It is also possible to merge the feature sets of the multiple tags first, and then obtain the common temperature-feature function of the multiple tags by fitting.

Figure 13:
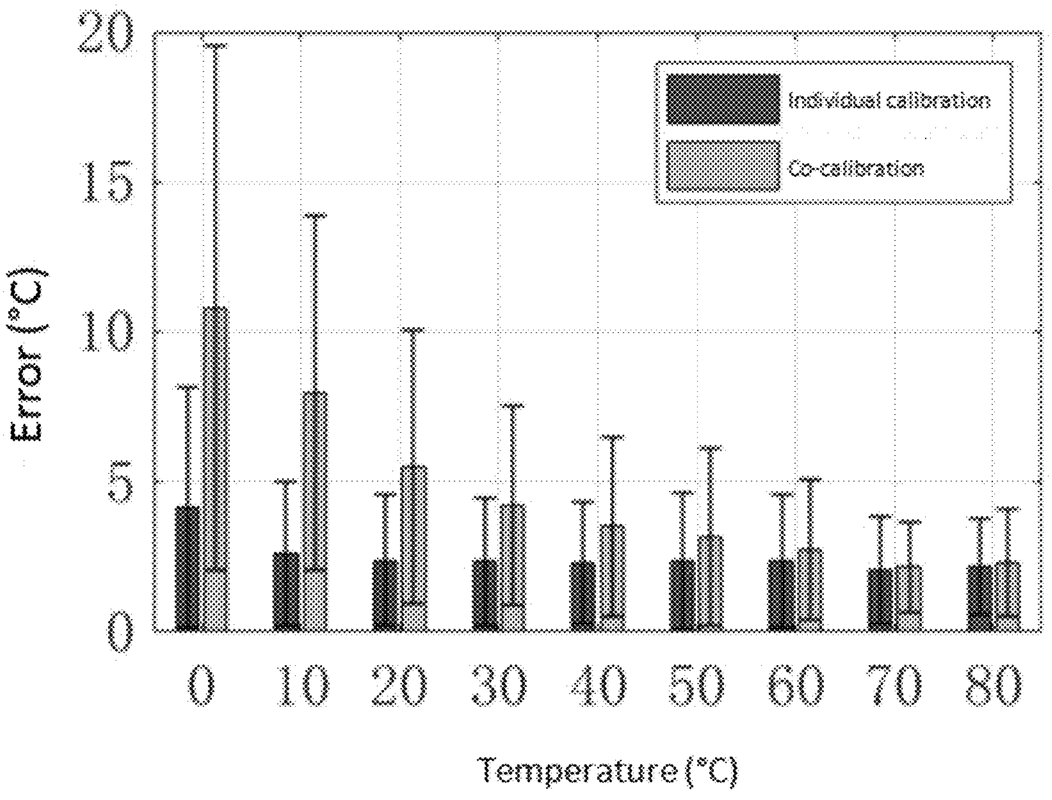
FIG. 13 is a temperature measurement error of single-tag calibration and multi-tag co-calibration.

These two approaches can shorten the tag calibration process, but will result in some degradation in accuracy because hardware variability between tags is not considered. FIG. 13 compares the temperature detection error between 0° C. and 80° C. for individual calibration and co-calibration. It can be seen that the co-calibration also has higher detection accuracy when the detection temperature is higher than 30° C. When the temperature is below 30° C., the accuracy of the individual calibration is significantly higher than the co-calibration. Therefore, there is a need in practical situations to flexibly choose a suitable calibration manner according to the temperature range and the accuracy requirements.

Figure 14:
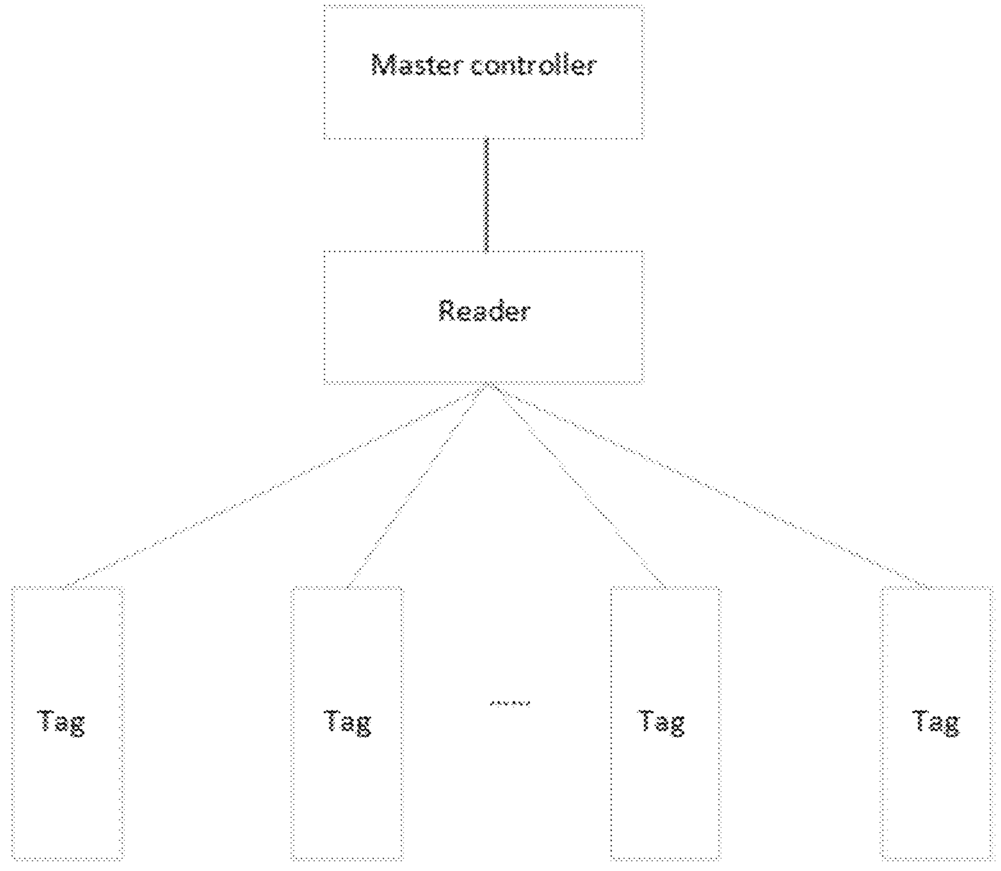
FIG. 14 is a schematic diagram of a temperature measurement apparatus based on a passive RFID tag according to an embodiment of the present disclosure.

FIG. 14 is a schematic diagram of a temperature measurement apparatus based on a passive RFID tag according to the present disclosure, including a reader and a master controller, wherein the master controller can communicate with the reader to perform the temperature measurement method described above.

The master controller may be a computer system such as a notebook computer or a desktop computer, in which the development of the control program and the user interface is implemented using, for example, Java as development software, and in which the master controller may communicate with the reader using the low level reader protocol (LLRP) specified in the relevant standard.

Thus, it can be seen that the temperature measurement method of the present disclosure does not require any modifications to the hardware or firmware of the tags and readers, but only utilizes a master controller with an associated temperature measurement program to communicate with the readers.

So far, those skilled in the art should realize that although several exemplary embodiments of the present disclosure have been shown and described in detail herein, many other variations or modifications in line with the principles of the present disclosure may be directly determined or deduced from the present disclosure of the present disclosure without departing from the spirit and scope of the present disclosure. Therefore, the scope of the present disclosure should be understood and deemed to cover all such other variations or modifications.

What is claimed is:

1. A temperature measurement method based on a passive RFID tag, comprising:

acquiring a circuit temperature feature of a tag multiple times, and establishing a tag temperature-feature correspondence; and estimating, by using the tag temperature-feature correspondence and the current circuit temperature feature of the tag, a temperature of an environment where the tag is located;

wherein the circuit temperature feature of the tag is a maximum discharging duration within which a passive RFID tag can operate normally during a discharging process after the tag is fully charged and then powered off; and the passive RFID tag is an unmodified, commercial off-the-shelf (COTS) RFID tag and deployed directly on existing commercial RFID devices without any modifications to hardware or firmware of the passive RFID tag.

2. The temperature measurement method according to claim 1, wherein acquiring the circuit temperature feature of the tag multiple times, and establishing the tag temperature-feature correspondence comprises:

placing the tag in different temperature environments, measuring and recording the maximum discharging duration corresponding to the temperatures, and forming a feature set of two-element tuples that consist of the maximum discharging duration and the temperature values; and fitting the feature set of the tag to obtain the temperature-feature correspondence.

3. The temperature measurement method according to claim 1, wherein the maximum discharging duration is determined by measuring a persistence time of a volatile memory of the tag.

4. The temperature measurement method according to claim 3, wherein the method of measuring a de-energized persistence time comprises the following steps:

turning on a reader and writing data into the volatile memory of the tag, wherein the volatile memory requires electrical power to maintain data states; and turning off the reader, and querying a data of the volatile memory after a waiting time t; taking a current waiting time as the de-energized persistence time of the volatile memory provided that the data changes, and updating the waiting time t with a step length Δt, and returning to an operation of writing data provided that the data does not change until the waiting time t corresponding to the data change is acquired.

5. The temperature measurement method according to claim 3, wherein the method of measuring a de-energized persistence time comprises the following steps:

writing data into the volatile memory by a reader, wherein the volatile memory requires electrical power to maintain data states;

turning off the reader, and querying a data of the volatile memory after a waiting time t, taking a current waiting time as the de-energized persistence time of the volatile memory provided that there are tags whose data changes for the first time; updating the waiting time t with a step length Δt, and returning to an operation of writing data provided that there are no tags whose data changes; and updating the waiting time t with a step length Δt, and returning to the operation of writing data until the de-energized persistence time of the volatile memory is acquired provided that there are tags whose data does not change.

6. The temperature measurement method according to claim 3, wherein the method of measuring a de-energized persistence time comprises the following steps:

turning on a reader and writing data into the volatile memory of the tag, wherein the volatile memory requires electrical power to maintain data states; and querying, by the reader, a data of the volatile memory continuously until the data changes, and taking a waiting time for waiting for the data change as the de-energized persistence time of the volatile memory; wherein the volatile memory is an S1 inventoried flag.

7. The temperature measurement method according to claim 3, wherein the method of measuring a de-energized persistence time comprises the following steps:

writing data into the volatile memory by a reader, wherein the volatile memory requires electrical power to maintain data states; and querying, by the reader, a data of the volatile memory continuously, and taking a current waiting time as the de-energized persistence time of the volatile memory until the de-energized persistence time of the volatile memory are acquired provided that there are tags whose data changes; wherein the volatile memory is an S1 inventoried flag.

8. The temperature measurement method according to claim 7, wherein multiple target tags are an unmeasured tag subset of a target tag set within a reading range of the reader, and the reader selects a new unmeasured tag subset for measurement multiple times until the de-energized persistence time within the reading range of the reader is measured.

9. The temperature measurement method according to claim 2, wherein a temperature-feature function is obtained by performing least-squares fitting on a feature set of the tag.

10. The temperature measurement method according to claim 2, wherein feature sets of multiple tags are merged, and a common temperature-feature function of the multiple tags is obtained by fitting; or, parameters in a temperature-feature function are obtained using least-squares fitting on feature sets of the multiple tags respectively, and average values of corresponding parameters are taken as parameters of the common temperature-feature function of the multiple tags.

11. A temperature measurement apparatus based on a passive RFID tag, comprising a reader and a master controller, wherein the master controller communicates with the reader such that the apparatus performs the temperature measurement method according to claim 1.

* * * * *